United States Patent [19]

Kovarik

[11] Patent Number: 4,986,710

[45] Date of Patent: Jan. 22, 1991

[54] SCREW ANCHOR

[75] Inventor: Kerry M. Kovarik, Kutztown, Pa.

[73] Assignee: Emhart Inc., Towson, Md.

[21] Appl. No.: 520,046

[22] Filed: May 7, 1990

[51] Int. Cl.⁵ .............................................. F16B 13/04
[52] U.S. Cl. ........................................ 411/38; 411/55; 411/427
[58] Field of Search ..................... 411/34–38, 411/55, 60, 61, 427, 432; 10/86 R, 86 F

[56] References Cited

U.S. PATENT DOCUMENTS

| | | | |
|---|---|---|---|
| 2,559,281 | 7/1951 | Croessant | 411/38 |
| 2,762,252 | 9/1956 | Karitzky | 411/38 |
| 3,497,890 | 3/1970 | Coyle | 10/86 R |
| 4,269,106 | 5/1981 | Leibhard et al. | 411/34 |
| 4,657,456 | 4/1987 | Anquetin | 411/61 |

*Primary Examiner*—Neill R. Wilson
*Attorney, Agent, or Firm*—Spencer T. Smith

[57] ABSTRACT

A screw anchor formed from a stamped blank. The nut has inner, outer and intermediate layers which are folded prior to rolling the nut into its final form. The inner and outer layers have a common edge and the inner layer tapers inwardly from the ends of the common edge. The formed nut exhibits tremendous strength.

3 Claims, 1 Drawing Sheet

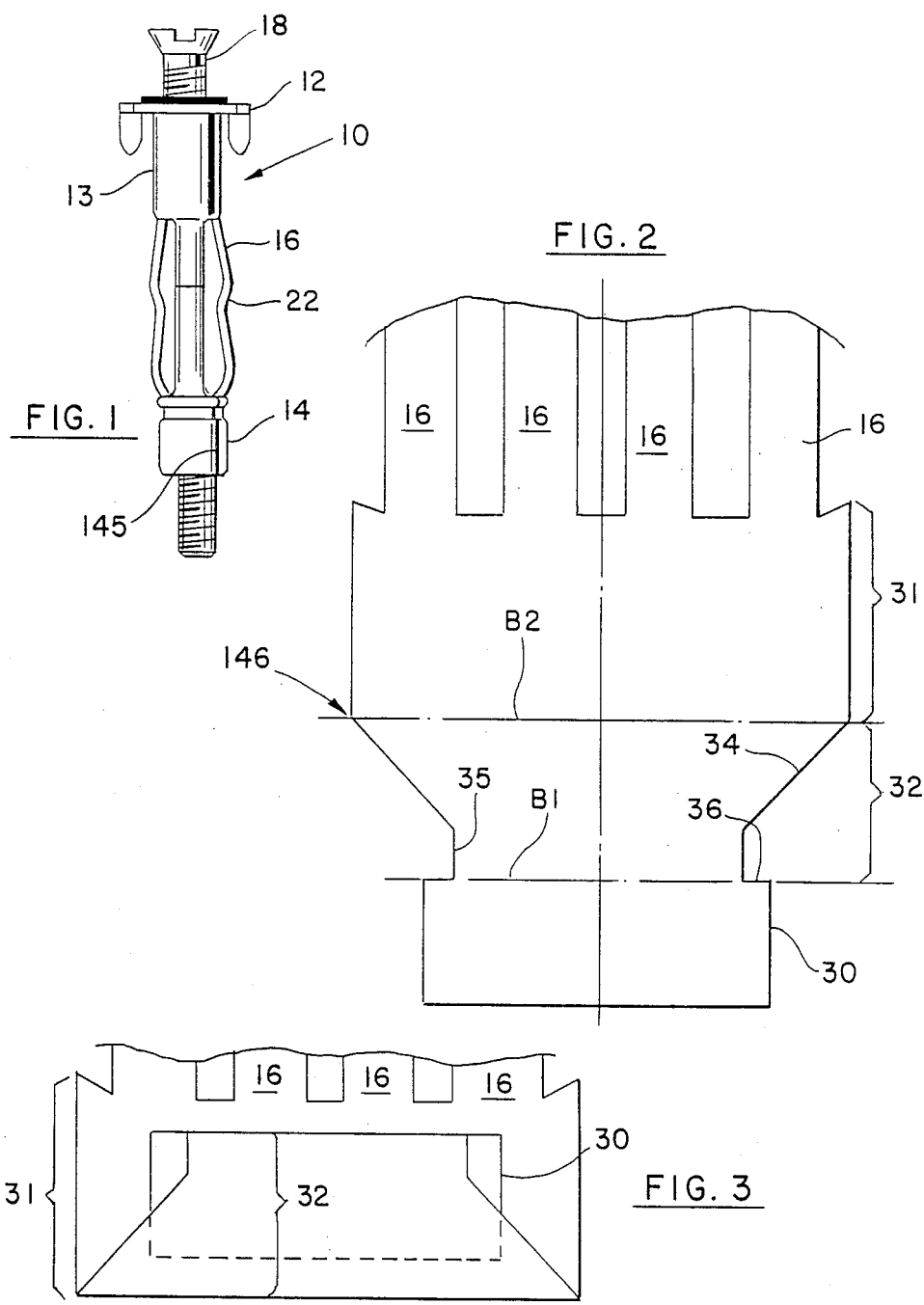

SCREW ANCHOR

SPECIFICATION

The present invention relates to blind screw anchors or inserts which are formed by stamping the part from strip stock in a die transfer process and rolling the stamped part into the cylindrical insert.

In such state of the art manufacture a head portion defined by an annular sleeve closed by a cap through which a fastener is inserted is defined at one end and an annular nut portion is defined at the other. Legs which are slightly bent at knee locations interconnect these ends. Threads are defined on the inner diameter of the nut end to receive the fastener which will collapse the legs thereby securing the insert. The nut may be defined by two layers of sheet stock which are folded together in a coining punch and die. Threading the fastener into the nut will tend to expand (open) the nut and the seam is accordingly welded to prevent such opening.

It is an object of the present invention to provide an improved stamped and formed insert wherein the nut end will not open even though it has not been welded.

Other objects and advantages of the present invention will become apparent from the following portion of the specification and from the following drawings which illustrate in accordance with the mandate of the patent statutes a presently preferred embodiment incorporating the principles of the invention.

Referring to the drawings:

FIG. 1 is a side view of a blind screw anchor made with the teachings of the present invention;

FIG. 2 is a top view of the nut end of the stamped blank which will be formed into the anchor illustrated in FIG. 1;

FIG. 3 is a view of the fully folded nut end shown in FIG. 2 prior to being rolled into the blind screw anchor shown in FIG. 1.

Blind screw anchors 10 include a flanged end or cap 12 which is secured to a sleeve 13. The sleeve is connected to the anchor nut 14 by a number of legs 16. A fastener 18 which passes through a hole in the cap is received by the threaded inner diameter of the nut. Tightening the fastener collapses the legs and draws them into engagement with the panel to which the insert is being secured. The legs are bent to form knees 22 which define the break location of the legs.

The blind screw anchor is formed from a flat blank which is stamped from a metal strip and then rolled to the final shape. The nut end 146 as it is stamped from a metal strip is shown in FIG. 2. The nut end 146 of the blank has a first rectangular portion 30 which defines the end of the blank, a substantially rectangular second portion 31 from which the legs 16a extend at one end and an intermediate portion 32 which tapers 34 down from the second portion 31 to a longitudinally extending segment 35 which defines a step 36 at either side of the first portion joining the wider first portion 30.

The first portion 30 is folded at the first bend line B1 in a conventional coining punch and die and the end is again folded at the second bend line B2 in the conventional coining punch and die to form the fully folded nut end as shown in FIG. 3.

When this fully folded end is rolled into the fully formed nut 14, the formed seam 145 is not welded or otherwise joined (it is an open seam). While the state of the art single folded double walled nut will open unless the seam is welded, and a man skilled in this art would believe that the same would occur in a triple fold. This triple fold exhibits extreme strength. The open seam will not open (the shaft of a screw will bend before the nut opens). Internal threads are rolled or cut on the inner surface (middle portion 32).

We claim:

1. A blind screw anchor comprising
a flange at one end,
a cylindrical sleeve adjacent said flange,
a cylindrical nut at the other end, and
a plurality of collapsible legs extending between said sleeve and said nut,
said nut including
a cylindrical outer layer having a longitudinally extending open seam,
an intermediate layer and
an inner layer,
said inner and outer layers having a common attached edge and said inner and intermediate layers having a common attached edge and
said inner layer tapering inwardly from the ends of said inner and outer layer common edge in the cylindrical plane of the inner layer of the nut.

2. A blind screw anchor according to claim 1, wherein said inner layer has a uniform width.

3. A blind screw anchor according to claim 2, wherein the width of said common edge between said inner and intermediate layers is shorter than the width of said intermediate layer.

* * * * *

UNITED STATES PATENT AND TRADEMARK OFFICE
CERTIFICATE OF CORRECTION

PATENT NO. : 4,986,710

DATED : January 22, 1991

INVENTOR(S) : Kerry M. Kovarik

It is certified that error appears in the above-identified patent and that said Letters Patent is hereby corrected as shown below:

TITLE PAGE:
Please add the following inventors after the name of Kerry M. Kovarik as they were mistakenly left out.

PHILIP G. HONSINGER

WINFIELD H. LANDO

Signed and Sealed this

Fourth Day of June, 1991

Attest:

HARRY F. MANBECK, JR.

*Attesting Officer*    Commissioner of Patents and Trademarks